(12) United States Patent
Roelands et al.

(10) Patent No.: US 10,441,938 B2
(45) Date of Patent: Oct. 15, 2019

(54) FLUID FLOW CONTINUOUS PHYSICAL OR CHEMICAL PROCESSES USING DEAN VORTICES

(71) Applicant: Nederlandse Organisatie voor toegepast-natuurwetenschappelijk onderzoek TNO, 's-Gravenhage (NL)

(72) Inventors: Cornelis Petrus Marcus Roelands, 's-Gravenhage (NL); Axel Sebastiaan Lexmond, 's-Gravenhage (NL); Earl Lawrence Vincent Goetheer, 's-Gravenhage (NL); Leonard Ferdinand Gerard Geers, 's-Gravenhage (NL)

(73) Assignee: NEDERLANDSE ORGANISATIE VOOR TOEGEPAST— NATUURWETENSCHAPPELIJK ONDERZOEK TNO, 's-Gravenhage (NL)

(*) Notice: Subject to any disclaimer, the term of this patent is extended or adjusted under 35 U.S.C. 154(b) by 868 days.

(21) Appl. No.: 14/434,689

(22) PCT Filed: Oct. 11, 2013

(86) PCT No.: PCT/NL2013/050728
§ 371 (c)(1),
(2) Date: Apr. 9, 2015

(87) PCT Pub. No.: WO2014/058320
PCT Pub. Date: Apr. 17, 2014

(65) Prior Publication Data
US 2015/0273430 A1    Oct. 1, 2015

(30) Foreign Application Priority Data
Oct. 12, 2012   (EP) .................................... 12188385

(51) Int. Cl.
*B01J 19/24*   (2006.01)
*B01J 19/18*   (2006.01)
*B01F 5/06*    (2006.01)

(52) U.S. Cl.
CPC ......... *B01J 19/2405* (2013.01); *B01F 5/0647* (2013.01); *B01J 19/185* (2013.01);
(Continued)

(58) Field of Classification Search
CPC .... B01J 19/2405; B01J 19/241; B01J 19/243; B01J 19/1831; B01J 19/185;
(Continued)

(56) References Cited

U.S. PATENT DOCUMENTS

| | | |
|---|---|---|
| 6,399,031 B1 | 6/2002 | Herrmann |
| 6,429,268 B1 | 8/2002 | Xiongwei |

(Continued)

FOREIGN PATENT DOCUMENTS

| | | |
|---|---|---|
| GB | 935431 | 8/1963 |
| WO | 2006025741 | 3/2006 |

(Continued)

OTHER PUBLICATIONS

Zheng, et al., The Axial Dispersion Performance of an Oscillatory . . . , Chemical Engineering Science, Oxford, GB, vol. 63, No. 7, pp. 1788-1799, 2007.
(Continued)

*Primary Examiner* — Marc C Howell
(74) *Attorney, Agent, or Firm* — Lucas & Mercanti, LLP

(57) ABSTRACT

The invention is directed to a method for carrying out a continuous physical or chemical process, in particular crystallization. The method of the invention comprises: comprising—flowing a fluid through a channel comprising an inlet and an outlet for said fluid, wherein said channel is at least in part curved and comprises at least two curvatures,—
(Continued)

Figure 1A:
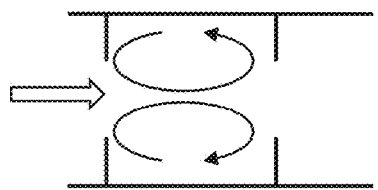
Figure 1B:
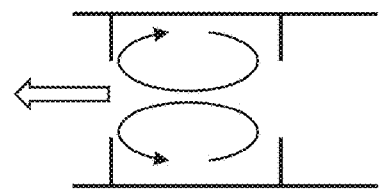

allowing said process to occur at least in part in said fluid in the presence of Dean vortices in said fluid, while—reversing the direction of the flow of said fluid in said channel multiple times, wherein Dean vortices in the fluid in the channel are maintained while the flow is reversed.

23 Claims, 4 Drawing Sheets

(52) U.S. Cl.
CPC ......... *B01J 19/1831* (2013.01); *B01J 19/241* (2013.01); *B01J 19/243* (2013.01); *B01J 2219/00162* (2013.01); *B01J 2219/00164* (2013.01); *B01J 2219/00166* (2013.01); *B01J 2219/24* (2013.01)

(58) Field of Classification Search
CPC .... B01J 2219/00162; B01J 2219/00164; B01J 2219/00166; B01J 2219/24; B01F 5/0647
USPC .......................................................... 366/341
See application file for complete search history.

(56) References Cited

U.S. PATENT DOCUMENTS

| | | | |
|---|---|---|---|
| 6,943,223 B1 * | 9/2005 | Bleijenberg | ........ B01F 13/0266 |
| | | | 521/56 |
| 2008/0316858 A1 * | 12/2008 | Gron | ....................... B01F 5/061 |
| | | | 366/341 |
| 2009/0304905 A1 | 12/2009 | Graham | |
| 2012/0171090 A1 | 7/2012 | Chang | |

FOREIGN PATENT DOCUMENTS

| | | | | |
|---|---|---|---|---|
| WO | 2009151322 | | 12/2009 | |
| WO | WO 2009151322 A1 * | | 12/2009 | ............ B01F 5/0646 |
| WO | 2011051728 | | 5/2011 | |
| WO | 2012095176 | | 7/2012 | |
| WO | WO 2012095176 A1 * | | 7/2012 | ............ B01F 5/0647 |

OTHER PUBLICATIONS

International Search Report issued in PCT Application No. PCT/NL2013/050728.

* cited by examiner

FLUID FLOW CONTINUOUS PHYSICAL OR CHEMICAL PROCESSES USING DEAN VORTICES

CROSS-REFERENCE TO RELATED APPLICATIONS

This application is a 371 of PCT/NL2013/050728, filed Oct. 11, 2013, which claims the benefit of European Patent Application No. 12188385.4, filed Oct. 12, 2012.

FIELD OF THE INVENTION

The invention is directed to a method for carrying out a continuous physical and/or chemical process, in particular crystallisation.

BACKGROUND OF THE INVENTION

Many physical and chemical processes in a fluid or multiphase reaction mixture comprising a fluid, are suitably carried out in a channel, such as in a tube reactor. Often two conflicting requirements exist: while high velocity is desirable, for example, to obtain good mixing and/or suspension of solid particles in the liquid, a low velocity is desirable for a sufficient long residence time of the mixture in the channel.

A high velocity is, for example, desirable for the formation of Dean vortices in a liquid flowing in a curved channel. Dean vortices are secondary, radial flow patterns that can occur when a liquid is flowed through a curved channel, such as a helical channel, due to centripetal forces.

The favourable effects of Dean vortices on various chemical processes, such as crystallisation processes, are described in WO-A-2006/025741 and WO-A-2009/151322. The favourable effects of Dean vortices, in particular for crystallisation processes, include improved stability of multiphase flows, higher mass and heat transfer, narrow residence time distribution, reduced energy consumption and an increased Reynolds number (Re) at which turbulence sets on. For crystallisation, this results in better control of particle morphology and particle size, narrow particle size distribution and good scalability of the process.

Without wishing to be bound by way of theory, it is believed that these favourable effects of Dean vortices are the result of good radial mixing, in combination with low mixing in axial direction, which results in the flow of the fluid through the cannel becoming more or less plug flow. This flow pattern is believed to result in reduced collusion of, for instance, particles and/or droplets in a liquid with each other, providing reduced attrition and coalescence and a more uniform product.

However, in practice, the problem has been encountered, that either the residence time of the fluid in the channel is very short or the channel very long, due to the minimum fluid velocity for the formation of Dean vortices. A long channel length has the disadvantage that the reactor becomes more expensive and that the energy consumption is higher. If the residence time is too short, the chemical process may be not complete.

Therefore, a need exists for an improved method for carrying out a physical or chemical process, combining the effect of Dean vortices with a short channel and a long residence time of the fluid in the channel.

A process and apparatus for reactive or anti-solvent crystallisation in a curved channel the presence of Dean vortices is described in WO-A-2006/025741. The channel is preferably a helical tube reactor, or spiraled crystalliser, with preferably up to 1000 turns. In the example, the channel length was 3 m, the number of turns 33, the flow rate 100 ml/min, Re was 707, and the Dean number was 272. A disadvantage is that the residence time was only 2.7 s, which is for many applications too short. For example, cooling crystallisation generally requires a much longer residence time.

WO-A-2009/151322 discloses a process and apparatus for carrying out multiphase reactions in the presence of Dean vortices formed due to flow of the feed through a curved channel, such as in the form of a spiral. It is mentioned that preferably a non-pulsating pump is used and that using pulsating pumps such as pistons or membrane pumps result in a fluctuating flow rate having a negative effect on the formation of Dean vortices. Pulsating pumps provide a pulsed flow that is fluctuating between a certain minimum, e.g. zero flow between two pulses and a certain maximum flow during a pulse in one axial direction. Flow reversal due to the pulsating flow is not disclosed. In an embodiment a reactor comprising helical modules is used in a batch process in a closed system. The beginning and the end of the reactor are alternately provided with overpressure and the flow is in this way reversed. According to the description, the length of one-way flow should be maximised and the flow should be reversed only after the mixture has passed a minimum of 25 windings.

GB-A-935 431 discloses oscillatory flow in a tube. A first flow is continuously subjected to a superimposed longitudinal oscillatory movement of sufficient power to repeatedly reverse the flow and produce turbulent flow conditions throughout the tube. Application in curved channels is not disclosed.

U.S. Pat. No. 6,399,031 discloses a curved tubular flow reactor wherein the direction of curvature alternates along the length of the tube. The changes in curvature direction result in a more narrow residence time distribution compared to a helical tube reactor. Reversal in axial flow direction in the channel, is not disclosed. The use of pulsation means, such as pumps, causing the reaction to proceed in a pulsed manner, does not disclose reversing the direction of the flow as pumps are normally provided with check-valves.

US-A-2008/0 316 858 discloses a baffled reactor with oscillatory flow and a channel in the reactor wall and/or a protuberance of the reactor wall, wherein said channel or protuberance is the baffle and is helically in the longitudinal direction. In a helically baffled tube, the baffle is helical, not the tube.

WO-A-2012/095176 describes an apparatus comprising an unbaffled reactor or micro-reactor having a channel with a plurality of directional changes and a hydraulic diameter from 0.1 mm to 10 mm and an oscillating flow device. In use, the net flow of the reaction stream is in the forward direction but the oscillating flow device slows, pauses and/or reverses the forward flow periodically. Piston pumps or diaphragm pumps modified by removing check-valves can be used as pulsators. It is mentioned that if the hydraulic diameter is larger than 10 mm, sufficient turbulence becomes a problem. Crystallisation of oxalic acid and potassium nitrate is described in a reactor constructed from a 10 m PTFE tubing with 2,54 mm internal diameter with continual changes of direction in helical fashion with an inner diameter of the helix of 1.9 cm and a diaphragm pump as oscillator.

US-A-2009/0 304 905 describes a continuous oscillatory baffled reactor with straight parts and connecting U-bend parts and an oscillating bellow. The connecting U-bend parts form only a small part of the length of the reactor.

Zheng et al., *Chem. Eng. Sci.* 2008, 63, 1788-1799 describe the axial dispersion performance of an oscillatory flow meso-reactor comprising straight tubes connected by U-bend parts. The reactor is curved over only a small part of the length of the reactor. The U-bend parts form only a small part of the length of the reactor.

US-A-2012/0 171 090 describes a continuous tubular flow reactor comprising multiple straight tubes connected by U-bend parts. A pressuring device is used having a simple harmonic motion driving device for providing in the fluid a harmonic reciprocating flow in superposition to the original longitudinal flow. The U-bend parts form only a small part of the length of the reactor.

SUMMARY OF THE INVENTION

Objective of the present invention is to provide a method for a physical or chemical process wherein one or more of the mentioned disadvantages are, at least in part, avoided.

A specific objective is to provide a method for a physical or chemical process in the presence of Dean vortices that allows for long residence times and a relatively short channel.

The inventors surprisingly found that one or more of the above mentioned objectives can at least in part be met by carrying out a physical or chemical process in a fluid flowing in a curved channel and changing the flow direction of the fluid.

DETAILED DESCRIPTION OF THE INVENTION

Accordingly, in a first aspect the invention relates to a method for carrying out a continuous physical or chemical process comprising flowing a fluid through a channel comprising an inlet and an outlet for said fluid, wherein said channel is at least in part curved and comprises at least two curvatures, allowing said physical or chemical process to occur at least in part in said fluid in the presence of Dean vortices in said fluid, while reversing the direction of the flow of said fluid in said channel multiple times, wherein Dean vortices in the fluid in the channel are maintained while the flow is reversed.

The inventors surprisingly found that the favourable effect of Dean vortices in the fluid in the channel can be maintained while the flow is reversed and the fluid flows backward and forward in the channel.

The method advantageously allow for a short channel length, larger residence time of the fluid, reduced residence time distribution of the fluid, good radial mixing, improved heat and mass transfer, lower costs and/or lower energy consumption. In case of crystallisation, the method provide as further advantages a better control of particle size and morphology.

In the process of the invention, Dean vortices in the fluid in the channel are maintained while the flow is reversed. It was surprisingly found that this provides the advantage of more effective use of the Dean vortices, in contrast to other systems, such as oscillatory flow baffled straight-tube reactors and zig-zag curved reactors.

In baffled straight-tube reactors with oscillating flow, a reversal of the primary direction of the flow (primary flow) results in an inversion of the secondary flow patterns (FIGS. 1A and B). Therefore, the primary direction of the flow is gradually reversed. For this reason, a reversal of the primary direction of the flow includes a gradual decrease of the flow rate, allowing sufficient time for the secondary flow to dissipate. Then the direction of the flow is reversed at a moment of zero flow rate and the flow rate is increased to a level sufficient to cause the desired secondary flow of the fluid form again. Hence, the flow is gradually reversed and the desired secondary flow decays during each reversal of the primary flow direction. The same applies for a flow through a zig-zag curved channel wherein the channel as a number of bends with alternating direction and therefore having alternating secondary flow patterns caused by each bend.

Figure 1C:
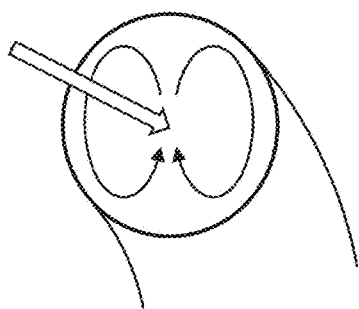
Figure 1D:
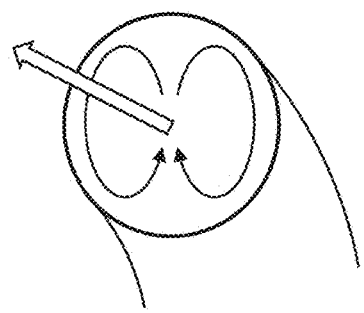

The inventors surprisingly found that the direction of rotation of the Dean vortices is independent of the axial direction of the primary flow (FIGS. 1C and 1D). In FIGS. 1C and 1D, the clock-wise rotating Dean vortices remains clock-wise rotating under reversal of the primary flow direction. A reversal of the direction of the primary flow with respect to the channel pathway does not result in a change of the direction of rotation of the Dean vortices. The inventors found that the Dean vortices can be more efficiently maintained when the Dean vortices are not dampened out with each reversal of the flow, in particular because the torque associated with the Dean vortices is not dissipated with each flow reversal.

Accordingly, the method of the present invention comprises reversing the direction of the flow such that Dean vortices in the fluid in the channel are maintained while the flow is reversed.

The step of reversing the direction of the flow involves consecutively reducing the flow rate, reversing the flow and increasing the flow rate. Therefore, a step of reversing the direction of the flow comprises a stage wherein the absolute axial velocity of the primary flow has a minimum (the fluid moves neither forward nor backward) and hence the flow rate has a minimum. During this stage, the Dean vortices will dampen out.

In order to benefit from the invariance of the Dean vortices under reversal of primary direction of the flow, the duration of this stage of minimum flow rate should be minimised and the fraction of the time wherein the Dean number is sufficient for Dean vortices (such as De>10) should be maximised.

This can in particular be ensured by reversing the flow suddenly, i.e in a short time relative to the damping time of the Dean vortices. In this way, the duration is minimised of the "dead point" occurring with each reversal of the flow, during which the velocity of the fluid is too low to maintain Dean vortices.

Maintaining Dean vortices during the flow reversals was found to be able to provide as advantages good radial mixing, heat transfer and mass transfer and a maintained laminar flow field.

The term "flow in forward direction" as used in this application is meant to refer to flow of the fluid in the channel in the axial direction of the channel from an inlet for the fluid to an outlet for the fluid in the channel.

The term "flow in backward direction" as used in this application is meant to refer to flow of the fluid in the channel in the axial direction of the channel from an outlet for the fluid to an inlet for the fluid in the channel.

The term "forward flow step" as used in this application is meant to refer to a period wherein the fluid is flowed in the forward direction. Similarly, the term "backward flow step"

as used in this application is meant to refer to a period wherein the fluid is flowed in the backward direction.

The term "axial direction" as used in this application is meant to refer to the direction along the channel pathway. The channel pathway is the path traced through the centre of mass of the shape formed by the channel.

The term "axially curved" as used in this application is meant to refer to a curvature of the channel pathway.

The term "axial movement" as used in this application is meant to refer to a movement along the channel pathway.

The term "flow period" as used in this application is meant to refer to a period of time between two reversals of the direction of the flow.

The term "primary flow" as used in this application is meant to refer to the component of the flow along the channel pathway. The primary flow is conventionally considered to match the flow pattern obtained under the assumption that fluid is inviscid. Dean vortices are conventionally described as a secondary flow pattern superimposed on a primary flow.

The term "flow rate" as used in this application is meant to refer to the volumetric flow rate of the fluid in the channel.

The term "average" for a value of property as used herein is meant to refer to the mean value.

Preferably, the Dean vortices in the fluid are maintained by reversing the direction of the flow of said fluid in said channel such that that the Dean number De of the flow of the fluid is 10 or more for 90% or more of the time. Preferably the Dean number De of the flow of the fluid is 10 or more, more preferably 20 or more, even more preferably 30 or more or 50 or more, for 90% or more of the time, more preferably 95% of the time, even more preferably 99% of the time, in particular of the time of a flow period. This allows Dean vortices to be maintained in the fluid during each flow reversal.

Reversing the direction of the flow of said fluid in said channel typically comprises a modulation over time of the flow rate of the fluid.

Generally, a step of reversing the direction of the flow comprises the consecutive steps of: reducing the flow rate, reversing the flow direction and increasing the flow rate of said fluid in said channel.

In particular, the flow rate will have a minimum around the moment of reversal of the direction of the flow. Therefore, directly after a flow reversal, a flow period will comprise a time part wherein the flow rate will be lower than the mean flow rate during that flow period. In the same way, directly prior to a flow reversal defining the end of the flow period, a flow period will comprise a second time part wherein the flow rate will be lower than the mean flow rate during that flow period. Therefore, a flow period will comprise a two periods wherein the flow rate will be lower than a limit of e.g. 50% or 25% or 10% of the mean flow rate during that flow period. These limits can be used to quantify the degree of suddenness of the flow reversal.

Preferably, a step of reversing the direction of the flow comprises the consecutive steps of: reducing the flow, reversing the flow and increasing the flow of said fluid in said channel, such that the fraction of the time wherein the flow of the fluid has a volumetric flow rate of less than 25% of the mean volumetric flow rate of the fluid per time period between two reversals of the direction of the flow is less than 10%, more preferably less than 5%.

Preferably, the time period between two reversals of the direction of the flow comprises a step wherein the flow rate is essentially constant, such as not increased or decreased by more than 5%. Preferably, the ratio of the duration of a step wherein the flow rate is essentially constant and the duration of a step of reversing the direction of the flow is 5:1 or more, preferably 10:1, even more preferably 20:1. Reversing the flow in this way can for example be carried out using a modified plunger pump or piston pump without check valves.

Optionally, the relaxation time $\tau_v[s]$ of the Dean vortices can for example be calculated as:

$$\tau_v = \frac{d^2}{v} \quad (1)$$

With d=internal diameter of the channel (for example, diameter of tube) [m], and $$v = \frac{\rho}{\eta}$$

kinematic viscosity of the fluid [m$^2$/s] with $\rho$ density of the fluid [kg/m$^3$] and $\eta$=dynamic viscosity of the fluid [Pa·s].

The relative time scale for relaxation of the vortex can now be defined as:

$$R\tau_v = \frac{\tau_p}{t_f} = \frac{fd^2}{v} \quad (2)$$

With $$t_f = \frac{1}{f}[s],$$

the duration of a now reversal, defined as the time the of the period wherein the fluid has a volumetric flow rate of less than 25% of the mean volumetric flow rate of the fluid, wherein the mean volumetric flow rate is per time period between two reversals of the direction of the flow.

If $$\frac{fd^2}{v} \gg 1:$$

the relaxation time of the vortex is larger than the flow reversal time, the vortex continues to exist during the flow reversal and does not decay. This allows particles stay in motion and prevents particles to settle.

If $$\frac{fd^2}{v} \ll 1:$$

relaxation time of the vortex is shorter than the flow reversal time, the vortex decays more rapidly than the flow is reversed and particles settle. This is in particular the case if the Dean number required for Dean vortices is larger than the Dean number obtained with a flow rate of 25% of the mean flow rate per flow period.

For a typical equipment with d=0.01 m and f=1 Hz, and for water v=10$^{-6}$ m$^2$/s, $$R\tau_v = \frac{fd^2}{\nu} \sim 100 \text{ so} \gg 1,$$

so the vortex flow stays in motion, also when the pulsation is at its dead point.

The fluid can be a liquid or a gas. Optionally, the fluid can comprise gas bubbles, liquid droplets, or solid particles. Hence, the fluid can be an emulsion or dispersion, including a suspension. Preferably, the fluid is incompressible. Preferably, the fluid is a liquid. The term "liquid" as used herein is meant to include emulsions and dispersions.

The physical or chemical process can be a process that is both physical and chemical. Carrying out a continuous physical or chemical process includes carrying out a physical and/or chemical process in a continuous mode.

The process suitably comprises crystallisation, and multiphase reactions in a multiphase reaction mixture comprising at least one liquid phase. Examples of such multiphase reaction mixtures include emulsions, suspensions, sols and foams. The reaction mixture may be multiphased at the start of the reaction, or become multiphased during the reaction. Examples of suitable reactions include heterogeneous catalysis, phase transfer catalysis, emulsion polymerisation and reactions in three phase systems such as hydrogenation, oxidation and/or hydroformylation in the presence of a catalyst. A three phase system typically includes a solid phase and two liquid phases, for example of two immiscible liquids. An example of another chemical processes is extraction The method is not limited by the composition of the fluid. The fluid can, for example, comprise one or more selected from the group consisting of water, molten inorganic salts, molten or liquid metals, and organic liquids such as molten fats or solvents. The fluid may be a mixture of multiple components.

The channel suitably comprises a tube, pipe, conduit, duct and/or microchannel. The channel is provided with an inlet and an outlet of the liquid, suitably at two ends of the channel.

The channel is at least in part curved. The curvature is preferably tree-dimensional. The curved channel preferably comprises at least two curvatures. Preferably, the channel comprises a helically curved channel, such a helically curved channel is continuously curved and each turn of the helix can be considered a curvature. Suitably, the curvatures are axial, i.e. the axis of the channel is curved, such as a channel having a curved pathway. In addition, the channel wall may be curved around the axis of the channel. For example, the channel may have a circular radial cross-section. Preferably, the channel is axially curved over 50% or more, by length of the channel, more preferably 90% or more, most preferably by 95% or more.

Suitably, the axis of the channel comprises a curve. Preferably, the curve has a torsion and preferably the torsion of the curve is either positive or negative, preferably constant, over the length of the channel. In case of channel comprising a plurality of helical parts, the channel preferably comprises a minimal number of transition parts between left-handed and right-handed helices, for example a ratio of the number of such transition to the number of turns of the helices of 1:100 or more, such as 1:200 or more. A channel comprising a plurality of helical parts can also comprise exclusively left-handed or only right-handed helices. For generating Dean vortices, the channel suitably comprises one or more three-dimensional curves.

The cross-section of the channel, in particular radial cross-section, can for example be rectangular, square, circular and/or elliptical. Preferably, the channel has a circular or elliptical cross-section, more preferably circular. This allows for more stable Dean vortices.

The channel volume is suitably filled with fluid for 90 vol. % or more, preferably 97 vol. % or more, more preferably 99 vol. % or more, most preferably completely filled, in particular when the process is allowed to occur. The wall of the channel is preferably in contact with fluid (e.g. wetted) for 90% of the surface or more, by total surface area of the wall of the channel, more preferably 95% of the surface or more, most preferably completely, in particular when the process is allowed to occur. This allows for more stable Dean vortices.

The method comprises flowing the liquid through the channel. The primary flow of the fluid is preferably in the channel in one of the two axial directions of the channel. In case of a channel with two ends, one end comprising an inlet for the fluid and the other end comprising an outlet, the two axial directions are the forward direction, from inlet to outlet, and the backward direction, from outlet to inlet, respectively.

Preferably, the primary flow of the fluid is such that secondary flow patterns, in particular Dean vortices occur in the channel. Preferably, the flowing of the fluid through the channel causes the presence of Dean vortices in the channel. The physical or chemical process is at least in part allowed to occur and/or carried out in the presence of Dean vortices.

Preferably, the method comprises subjecting the fluid to the action of Dean vortices. Preferably, the Dean vortices result from flowing the fluid through the channel. Preferably, Dean vortices are present over 50% or more, preferably 90% or more of the length of the channel.

The method comprises reversing the direction of the flow of the fluid in the curved channel multiple times. Suitably, the axial direction of the flow is reversed, suitably the axial direction of the flow relative to the channel. The term "reversing the flow" as used in this application is meant to comprise reversing the primary flow. Reversal of the primary flow comprises a change in the primary flow component from a first axial direction to the other axial direction. The direction of the flow is suitably reversed from forward to backward and vice versa. Accordingly, the flow is also pulsated. The flow comprises flow pulses between flow reversals.

Preferably, reversing the direction of the flow of said fluid in said channel comprises changing the direction of the flow along the channel pathway.

The physical or chemical process is allowed to occur while the flow is reversed multiple times. The flow may in addition be reversed before or after the process is allowed to occur. Moreover, part of the process may be allowed to occur while the flow is not reversed. Preferably, the method comprises allowing the process to occur and simultaneously reversing the flow of the fluid in the channel multiple times. The performance of the method depends on the number and frequency of flow pulsations, the strength of the flow pulsation relative to the average velocity and the length of the flow pulsation relative to the diameter of the tube as show in equations (3)-(6), $$n = \frac{L}{l^+ - l^-} \quad (3)$$

-continued $$RA = \frac{l^+ + l^-}{2(l^+ - l^-)} \quad (4)$$

$$LA = \frac{l^+ + l^-}{2L_c} \quad (5)$$

$$RF = \frac{\rho r^2}{\tau \eta} \quad (6)$$

wherein n is the number of pulsations, $l^+$ is the length of the forward pulsation, $l^-$ is the length of the backward pulsation, L is the total length of the channel, RA is the relative amplitude of the flow pulsation, LA is the length of the flow pulsation relative to the length of a coil in the channel, $L_c$ is the length of a coil of the main channel, RF is the relative frequency, $\rho$ is the average density of the fluid, r is half of the hydrodynamic diameter of the channel, $\tau$ is the time scale of flow direction inversion, and $\eta$ is the viscosity of the fluid. When utilising a pulsating pump, $\tau$ can be tuned. The $\tau$ is determined by the frequency at which the pump moves.

The flow is preferably reversed 10 or more times during passage of fluid through the channel (n>10) and/or during the physical or chemical process, more preferably 50 times or more, even more preferably 100 times or more. Preferably, the flow is reversed less than 10 000 times during passage of fluid through the channel.

Suitably, the flow of the fluid is reversed each 60 s or less, preferably each 30 s or less, more preferably each 10 s or less. Preferably, the flow of the fluid is reversed each 0.1 s or more. The flow is suitably reversed at regular, multiple or irregular time intervals. Furthermore, the amplitude of the flow pulsation relative to the length of a coil in a channel (LA) should not be too short. Preferably, LA is more than 0.5, more preferably more than 1, even more preferably more than 2, and even more preferably 5 or more. The amplitude of the flow pulsation, relative to the net flow (RA), should be large, preferably more than 3, more preferably more than 10.

Due to the flow reversal, the instantaneous velocity of the fluid is small during the flow reversal, and therefore the instantaneous Dean number is also small. It is desirable that the Dean vortices are maintained during the flow reversal and that the flow is reversed such that the instantaneous velocity of the fluid is small for only a short time. This is achieved by a high frequency of the flow pulsation, relative to the time scale on which the secondary flow dampens out during flow inversion.

This is quantified with the dimensionless number relative frequency (RF). The relative frequency is preferably larger than 2, more preferably larger than 10, even more preferably larger than 50.

Suitably, the fluid is flowed through the channel as a result of the combination of a first flow and a second oscillatory flow. Both the first flow and the second oscillatory flow are axial. The first flow is suitably constant in one axial direction, the forward direction. The direction of the second oscillatory flow oscillates between the two axial directions, suitably the backward and forward direction. The velocity of the oscillatory flow is preferably larger than the velocity of the first flow. The ratio of oscillatory flow and mean flow is quantified by the relative amplitude of the flow pulsation, RA. Preferably, the relative amplitude (RA) is two or more, more preferably the relative amplitude of the flow pulsation is more than 10. The RA is preferably less than $10^5$.

Reversing the flow preferably comprises a flow reversal step, wherein preferably 90 vol. % or more of the primary flow is reversed. Preferably, the total fluid in the channel is reversed. A flow reversal step may be carried out simultaneously with other steps.

The flow is suitably reversed by applying high pressure at one end of the channel and/or low pressure at another end of the channel, and/or by providing alternating high and low pressure at one or more positions in the channel. Alternatively, the flow can be reversed by axially moving actuators in the channel.

In addition, the flow of the fluid in the channel may reverse locally in the channel, relative to the axial direction, due to the shape of the channel or due to the presence of protrusions, such as baffles, in the channel wall. Preferably, the channel wall does not comprise protrusions, such as baffles. Hence, the channel is preferably unbaffled. Preferably, the wall of the channel is smooth. The ratio $R_a$ to channel diameter is preferably at least 1:500. Roughness of the wall and protrusions on the wall may distort the Dean vortices.

In the method of the invention, the fluid can be flowed alternately in the backward and forward direction in the channel. A period wherein the fluid is flowed in the axial direction of the channel from inlet to outlet for the fluid in the channel is then a forward flow step and a period wherein said fluid is flowed in the axial direction of the channel from outlet to inlet for the fluid in the channel is then a backward flow step. The channel then comprises a helical tubular channel with a plurality of turns, and wherein the fluid flows forward through 0.1-100 turns in a forward flow step, preferably 1-25 turns, more preferably 2-10 turns.

The ratio between displaced fluid volume in a forward flow step and the displaced fluid volume in a backward flow step may be more than 1, preferably 1.01-1.1, more preferably 1.01-1.05.

The distance obtained by dividing the displaced fluid volume of a forward flow step by the cross-sectional area of the channel, moved by the fluid in the channel in a forward flow step can be 10 times or more than the inner diameter of the channel, wherein the channel has a constant cross-sectional area and inner diameter, preferably 75 times of more.

In case the process comprises crystallisation of a liquid or a compound dissolved in a liquid, the method preferably comprises allowing said crystallisation to occur by subjecting said liquid to crystallisation conditions of said compound, and reversing the flow of said liquid.

The compound can be a variety of substances, such as inorganic compounds, organic compounds and salts of organic compounds. The compound can suitably comprise a pharmaceutical, a pigment, a food additive and/or a chemical intermediate. The process may result in the crystallisation of two or more compounds. The method is especially suitable for the melt crystallisation of fats.

In an embodiment, a fluid, such as the liquid, is simultaneously subjected to crystallisation conditions of the compound, such as simultaneously with one or more steps of reversing the direction of the flow of said fluid. Subjecting the liquid to crystallisation conditions of the compound can comprise cooling, addition of anti-solvent, solvent evaporation and/or reactive crystallisation. Preferably, cooling crystallisation is applied to a melt or a solution of the compound. The skilled person can readily select the most appropriate method for subjecting the liquid to crystallisation conditions of the compound, depending on the compound and the desired crystallite properties, such as particle size and morphology.

By subjecting the liquid to crystallisation conditions of the compound, the compound crystallises and a crystalline solid is formed. The crystalline solid may comprise crystals, crystallites, microparticles, nanoparticles, agglomerates, and/or precipitate. The crystalline solid may comprise a plurality of compounds, for example due to contaminations and/or co-precipitation.

The crystalline solid preferably remains suspended in the liquid and does preferably not settle. In this way, unwanted deposition on the inner surface of the wall of the channel, which may eventually result in encrustation, scaling or clogging of the channel, is avoided.

Preferably, the channel comprises a tube. Preferably, the channel comprises a helical tube with a plurality of turns. Preferably, the channel has 2-10 000 turns, more preferably 10-10 000, more preferably 50-1000 turns, more preferably 100-500 turns. The helical tube preferably has a circular radial cross-section.

Preferably, the helical tube is a circular helix tube. Preferably, the diameter of the turns of the helical tube is 100 times or less, more preferably 50 times or less, the inner diameter of the tube.

Preferably, the fluid is flowed alternately in backward and forward direction in the channel.

Preferably, the Dean number De of the flow of the fluid, is less than 3000, preferably in the range of 0.5-1500, more preferably in the range of 3-1000, most preferably in the range of 10-300. The Dean number De is defined according to equation (7), $$De = Re\sqrt{\frac{D_i}{D}} \quad (7)$$

wherein $$Re = \rho \cdot v \cdot \frac{D_i}{\eta} \quad (8)$$

$D_i$ is the hydraulic diameter of the channel, D is the diameter of curvature of the channel, $\rho$ is the density of the fluid, v is the average absolute axial velocity of the fluid, and $\eta$ is the dynamic viscosity of the fluid.

Re is the Reynolds number. The diameter of curvature D=2R, wherein R is the radius of curvature of the channel. The hydraulic diameter $$D_i = \frac{4A}{P},$$

wherein A is the cross-sectional area of the channel and P is the wetted perimeter of the cross-section of the channel. For a channel with circular cross-section, $D_i$ is the inner diameter of the channel.

In case the hydraulic diameter of the channel and/or the diameter of curvature of the channel are not constant over the length of the channel, suitable the average Dean number is used and the average hydraulic diameter and average diameter of curvature of the channel, in particular the mean values.

Absolute axial velocity indicates velocity in axial direction, wherein both axial directions (backward and forward) are positive. The average absolute axial velocity of the fluid can be measured by measuring the axial distance flowed by the fluid in the channel and the time between two reversals of the flow. The term "average absolute axial velocity" refers to the mean velocity obtained in this way. Suitably, the average absolute axial velocity of the fluid v is taken as average, in particular mean, over the whole volume of the channel and over the time for passage through the channel. If the flow reversal is periodic, v can be taken over the period.

Preferably, the channel wall has a maximum relative roughness $R_{a,r}$ of 0.1. $R_{a,r}$ is related to the surface roughness $R_a$ via $$R_a = R_{a,r} \cdot \delta_v \quad (9)$$

$$\delta_v = \frac{\eta_k}{v_f} \quad (10)$$

$$v_f = \sqrt{\frac{\tau}{\rho}} \quad (11)$$

$$\tau = \eta \left(\frac{dv_w}{dy}\right)_{y=0} \quad (12)$$

wherein $\delta_v$ is the viscous length [m], $\eta_k$ is the kinematic viscosity of the fluid [m²/s ], $v_f$ is the friction velocity [m/s], $\tau$ is the wall shear stress, p is the fluid density [kg/m³], $\eta$ is the dynamic viscosity [Pa·s], $v_w$ is the flow velocity parallel to the wall [m/s], and y is the distance to the wall [m].

$R_a$ is the arithmetic average of the roughness profile of a surface. If the vertical deviations are large (i.e. the surface is rough), the $R_a$ value will be large. If the vertical deviations are small (i.e. the surface is smooth), the $R_a$ value will be small.

Usually, $v_f$ is estimated using numerical simulations. However, according to Quadrio (M. Quadrio, S. Sibilla, *Journal of Fluid Mehanics* 2000, 424, 217-241) $v_f$ can be estimated by $$v_f = \frac{v}{14},$$

in which v is the bulk velocity [m/s]. As an example, for a watery fluid this leads to a maximum roughness of 20 nm. Glass is a substance that is naturally smooth ($R_a$=3 nm) and is therefore a very suitable material for the inner surface of the channels in the present invention. Stainless steel may also be used as the inner surface of the channel. For example, stainless steel alloy 316L can have a surface roughness as small as 10-20 nm. Applying a coating to smoothen the inner surface of the channel may also be used in order to reach the desired smoothness.

The channel preferably comprises for at least a fraction of the channel length an inner surface with $R_a$ of 0.1 or less, preferably 50% or more of the channel length, more preferably 90% or more, most preferably the entire length of the channel has a smooth inner surface.

The process of the present invention is in particular suitable for precipitation processes, for example for precipitation of one or more compounds in submicron or microparticles due to for example crystallisation of the compounds For precipitation of microparticles (mean particle size larger than 1 μm, for example larger than 10 μm, typically 1-100 μm), sedimentation of the particles is desirably prevented in the channel by virtue of Dean vortices. In order to avoid sedimentation of the particles during the flow reversals, it is important that the relaxation time of the Dean vortices is longer than the time involved with a reversal of the flow. This is also important for suspension of particles with mean particle size of 100 μm, such as 200 μm or more in the fluid. Hence, the fluid preferably comprises a catalyst slurry and/or cells, the physical and/or chemical process preferably comprises (re)crystallisation of compounds from a solution or a melt.

Furthermore, the chemical and/or physical process preferably comprises a treatment process of particles with a mean size of 10 μm or more, preferably 100 μm or more, for example a chemical process at the internal and/or external surface of the particles, such as forming a coating. Because sedimentation of the particles can reduced and/or prevented, and because the particles can be more uniformly dispersed in the laminar flow, the product will have more uniform properties.

The process invention is advantageously characterized by mild shear. This is in particular relevant for submicron particles (mean particle smaller than 10 μm, such as 5 μm or less, such as 1 μm or less). For such particles, mixture effect can occur during formation of such small particles by crystallisation. Therefore, it is beneficial to prepare these particle in a laminar shear field. In the process of the invention, the Dean vortices provide a controlled turn while the flow reversals provide a longer residence time. However, the flow reversal (and associated dead flow period) should be short compared to the decay time of the laminar field. Therefore, the Peclet number is preferably less than 10 in the process (Mazzanti et al., *Crystal Growth & Design* 2003, 3(5), 721-725).

The invariance of the rotation of the Dean vortices under reversal of the flow (in primary direction) can reduce collusions between the formed particles during flow reversals and therefore can contribute to a more uniform particle size distribution and/or a more uniform residence time distribution.

For these reasons, the process of the invention is in particular suitable for applications wherein a laminar shear filed is required, for example crystallisation and/or recrystallisation of fatty compounds, for aligning proteins and for the synthesis of nanoparticles. The process is therefore also suitable for the nucleation of small molecule crystals and for protein structuring.

The process is furthermore in particular suitable for the fermentation, cultivation, culturing and/or growth of shear-sensitive organisms, tissues, cells and other (micro)biological material. Fermentation of such shear-sensitive material is described in Tanzeglock, *A Novel Lobed Taylor-Couette Bioreactor for the Cultivation of Shear Sensitive Cells and Tissues*, dissertation ETH Zurich, 2008. Shear-sensitive indicates includes a beneficial and/or detrimental reaction to shear. In such a process, the shear can be more precisely controlled and can be more homogenous compared to e.g. a stirrer.

Preferably, the process comprises reactive crystallisation, for example precipitation to produce nanoparticles, wherein reactants are mixed in a first step under high shear conditions, a short mixture time and high degree of super saturation and wherein the produced seed crystals are subjected to a second step of growth in a curved reactor with pulsed flow as described. In this second step, the seed crystals can grow under mild shear in a well mixed laminar flow, by virtue of Dean vortices. Optionally, the crystals can recrystallise under low super saturation.

Yet further, the chemical and/or physical process preferably comprises a treatment of nanoparticles (mean particle size 1-1000 nm, typically 10-500 nm). Typical chemical and/or physical treatments of nanoparticles include a thermal treatment and a treatment comprising a chemical process at the surface of the nanoparticles, for example forming a solid material layer (coating layer) around the particles. As these particle can be more uniformly dispersed in the laminar flow field, a more uniform product can be obtained.

Preferably, anisotropic nanoparticles are formed in such a process (for example, platelet and/or needle nanoparticles). The process preferably comprises alignment of such particles in the laminar flow field, by virtue of Dean vortices.

Yet further, the process can comprise the formation of fibres of protein particles and alignment of the fibres in the fluid, by virtue of Dean vortices, and subjecting the aligned fibres in the fluid to a chemical and/or physical process, for example a thermal and/or enzymatic process. As the Dean vortices are maintained, the fibres advantageously remain aligned during the chemical and/or physical process.

The chemical and/or physical process of the invention preferably comprises processing of fibrous proteins and/or fibrilisation of proteins, in particular structuring and/or alignment of protein fibres and protein filaments, for example of casein and calcium caseinate. The process can for example be a step in a method for the preparation of a food product as structuring protein fibers contributes for example to texture of food products, in particular of substitute products for meat.

The process preferably comprises crystallisation and/or recrystallisation of fatty compounds, such as oil and or fat, preferably comprising one or more selected from the group consisting of triglicerids, triacylglycerols (TAGs), diacylglycerols (DAGs), monoacylglycerols (MAGs), free fatty acids (FFAs), phospholipids, glycolipids and sterols; preferably for 90 wt. % or more and 10 wt. % or less other compounds.

The process is in particular suitable for crystallisation and/or recrystallization for palm oil, soybean oil, rapeseed oil, milk fat and cocoa butter, and respective fats.

The importance of shear for such processes has been described in Mazzanti et al., *Crystal Growth & Design* 2003, 3(5), 721-725, and Mazzanti et al., *Phys. Rev. E* 2005, 71, 041607.

These processes benefit form a laminar shear field, probably by a mechanism of alignment of particles and/or the compounds, such a laminar shear field (for example Taylor-Couette flow) is typically created in the prior art by a Couette reactor. A laminar flow field can also be obtained in a tube under laminar flow conditions, for example in a straight tube with Reynolds' number Re<about 2200. However, because of the velocity gradient in such case, small particles contained in the flow will have very different residence time and a wide residence time distribution will be obtained, which is a disadvantage. A more uniform residence time distribution can be obtained with turbulent flow (in a straight pipe with Re>about 4000) and therefore plug flow. In such a turbulent flow, there is no laminar shear field to benefit from, and particles are not expected to stay aligned, particles will typically collide in such a flow.

In the curved channel of the invention, in particular in a helical tube, additional Dean vortices can form that can redistribute the flow and small particles contained in the flowing fluid by laminar mixing, in particular laminar radial mixing. With such laminar mixing, particles can remain aligned and collusion and aggregation of the particles can be prevented.

Hence, it is important that Dean vortices in the fluid in the channel are maintained while the flow is reversed in order to maintain a laminar shear field in the fluid. This is independent of the prevention of sedimentation and also applies to small particles that would not, or only slowly, sediment in the channel. Nevertheless, the relaxation time of the Dean vortices is the same for maintaining a laminar shear field.

Furthermore, the transition of laminar flow to turbulent flow preferably occurs at a higher Re number of 8500 or more, therefore the laminar flow is preferably stabilised by Dean vortices. The process of the invention can therefore provide a more uniform residence time distribution of the flow, compared to laminar flow in a straight tube. Particles contained in the flow, especially formed in the flow, have a more uniform residence time distribution and more monodisperse particles will be obtained. In this way, the process of the invention preferably combines a laminar flow field with laminar mixing. Preferably, the residence time of the fluid is 10 s or more, more preferably 60 seconds or more, even more preferably 10 minutes or more.

In an aspect, the process of the invention advantageously provides a flow, in particular a laminar shear field, that is competitive to a Couette reactor, with the additional advantage of a less complex structure and better scalability.

In an optional aspect of the invention, the process is therefore characterised by a shear as follows.

The shear rate of the flow in the curved channel, can be quantified as $$\tau = \frac{U_s}{D/2}, \quad (13)$$

wherein $\tau$ is the shear rate [s$^{-1}$], $U_s$ is the average shear velocity which equals 2/3 $U_{rms}$ with $U_{rms}$ being the root mean square of the pulsation velocity.

Therefore, the shear rate is preferably 1-100 s$^{-1}$, more preferably 50 s$^{-1}$ or less, more preferably 1-10 s$^{-1}$.

For our typical equipment with D=0.015 m, $U_{rms}$~1 m/s so $\tau$~90 s$^{-1}$. This fits in the range (lower end) that is applied in the applications where a laminar shear filed is required.

The method of the invention can be carried out in an apparatus, comprising
 a channel for flowing a fluid through said channel, wherein said channel is at least in part curved and comprises at least two curvatures, and
 one or more pulsating units for reversing the flow of said fluid in said channel.

Preferably, the apparatus is adapted for reversing the flow in such a way that the fraction of the time wherein the flow of the fluid has a volumetric flow rate of less than 25% of the mean volumetric flow rate of the fluid per time period between two reversals of the direction of the flow is less than 10%.

The channel has an internal diameter $D_i$ and a diameter of curvature D. Preferably, $D_i$ is larger than 0.5 mm, more preferably larger than 1 mm. For values of $D_i$ smaller than 0.5 mm, capillary action may hamper the formation of Dean vortices when small amounts of gases are dispersed in the fluid. Preferably, the ratio $D_i/D$ is 0.01 or more, preferably 0.03 or more. Preferably, the ratio $D_i/D$ is 0.1 or less.

Preferably, the channel has an internal diameter $D_i$ of 15 mm or more, such as 5 cm or more. Maintaining sufficient turbulence, such as Dean vortices, to prevent sedimentation of compounds was found to be possible with the specific pattern of flow reversal of the present invention.

The curved channel preferably has a circular or oval cross-section, more preferably a circular cross-section. The inner surface of the channel preferably comprises for at least 10% of the surface a part with $R_{a,r}$ of 0.1 or less, preferably for 50% or more of the surface, more preferably 90% or more, most preferably the entire inner surface has a $R_{a,r}$ of 0.1 or less.

Suitable materials for the wall of the channel include metals and alloys (such as steel, iron, aluminium, copper and brass), ceramics (such as silicon nitride and silicon carbide), (heat conducting) polymers, and glasses.

The one or more pulsating units suitably comprise a pulsating member forming a part of the wall of the channel. The channel is not necessarily curved at the location of the pulsating member.

The pulsating units are preferably adapted for moving the fluid in both axial directions through the channel. The apparatus may also comprise two or more pulsating units adapted for together moving the fluid in both axial directions through the channel. Accordingly, the pulsating units are preferably oscillating units. Suitable pulsating units include pulsating pumps with a programmable waveform.

The pulsating unit suitably comprises a piston pump adapted for moving the fluid in both axial directions through the channel. Preferably, the piston pump is provided without the conventional valves. The piston is suitably the pulsating member forming part of the wall of the channel.

The pulsating unit may suitably comprise a membrane pump, adapted for moving the fluid in both axial directions through the channel. Preferably the membrane pump is provided without the conventional valves.

Alternative pumps types which may be comprised in the pulsating unit include screw pumps, lobe and gear pumps and centrifugal pumps.

The outflow can be suitable controlled using a goose-neck tube or with an expansion vessel and a flow restriction.

The apparatus may suitably further comprise: heating elements, cooling elements, a heat exchanger, a primary inlet, secondary inlets, an outlet, an inlet pump, a leak stream pump, an ultrasonic transductor, a mixer, a separator for precipitate and temperature and pressure sensors.

Figure 3:
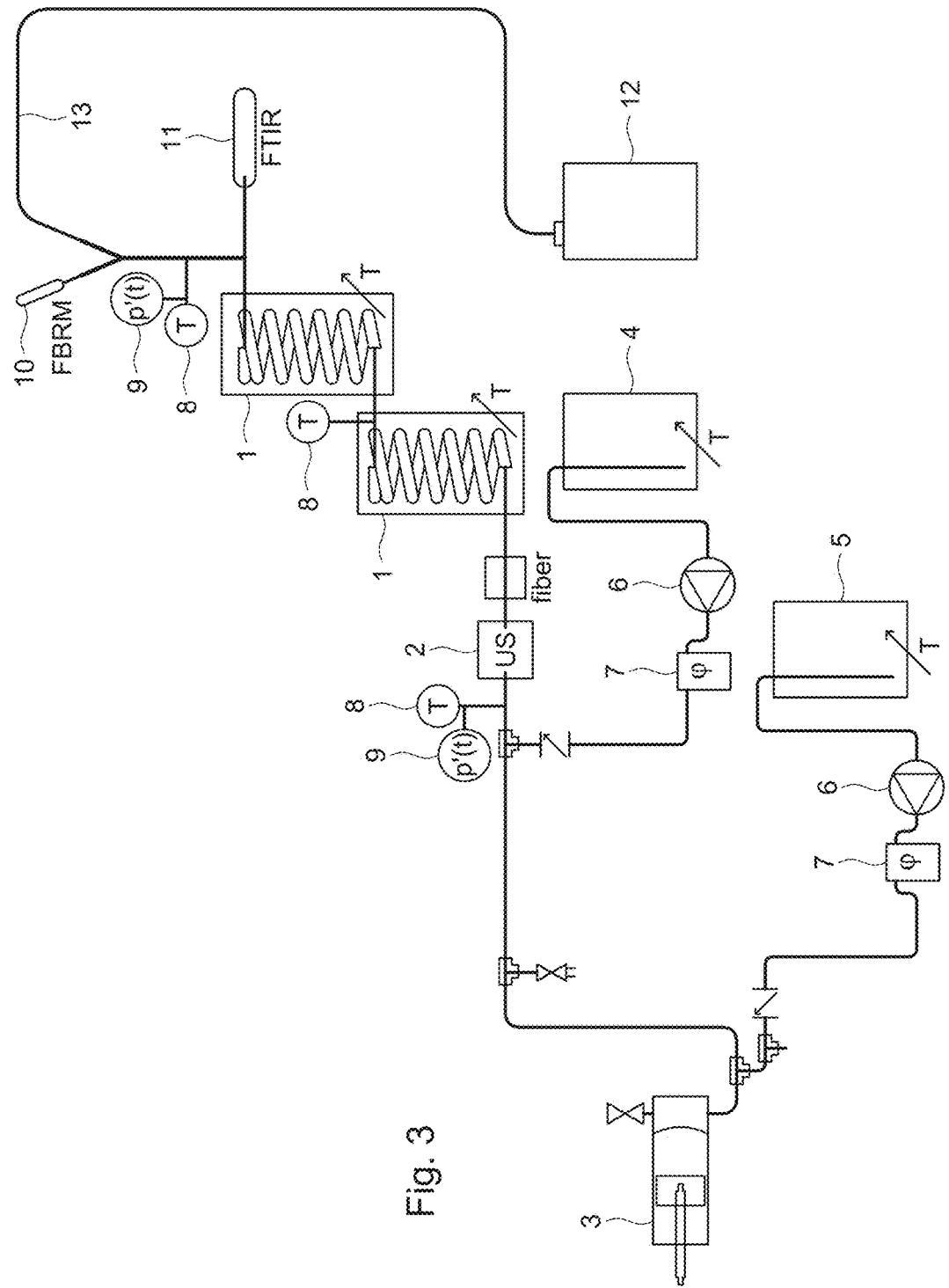

A possible implementation of the invention into a set-up for cooling crystallisation according to the invention is shown in FIG. 3. The set-up consists of a feed vessel (4) and a solvent vessel (5) both connected to a pump (6) and a flow meter (7). The combined stream fed to an ultrasonic probe for nuclei generation (2) and is pulsated by pulsator (3). After ultrasonic probe (2), the stream enters two helix reactors (1) (to allow for better temperature control). In the set-up of FIG. 3, product is collected in product vessel (12) via drain tube (13). The process is controlled and variables are determined by in line measurement equipment, such as temperature sensors (8), pressure sensors (9), particle size measurement equipment (10), and Fourier transform IR probe (11).

The invention will now be further illustrated by means of the following simulation example, which is not intended to limit the scope of invention in any way.

EXAMPLE

The advantageous effects of the invention are illustrated by the following simulation, based on calculations.

FIG. 1 shows the effect of primary flow direction reversal on secondary flow patterns caused by protrusions in the channel wall in a straight channel (1a and 1b) and on Dean vortices in a curved channel (1c, 1d). The direction of the Dean vortices is independent of the axial direction of the primary flow and is not affected by flow direction reversal.

Figure 2A:
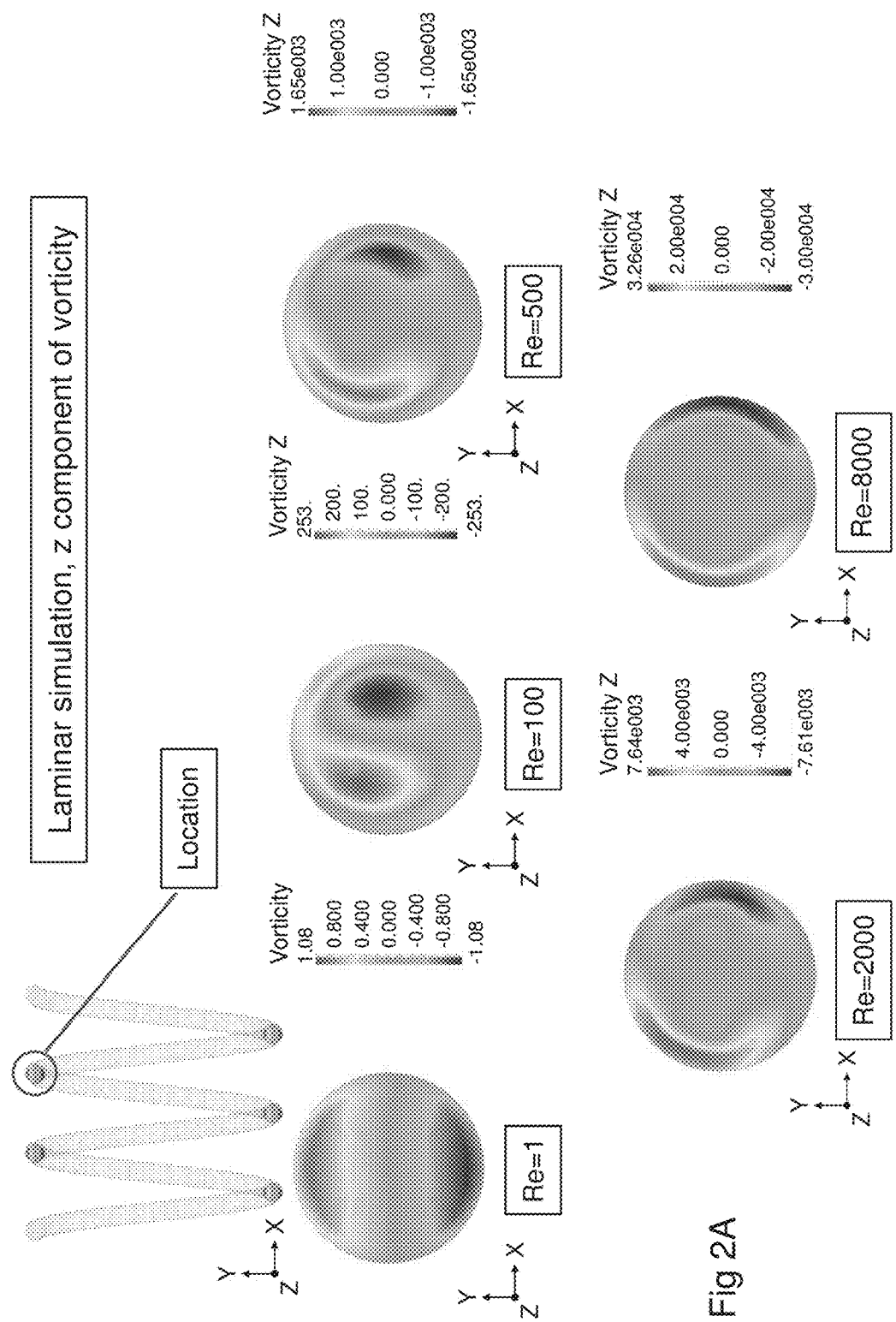
Figure 2B:
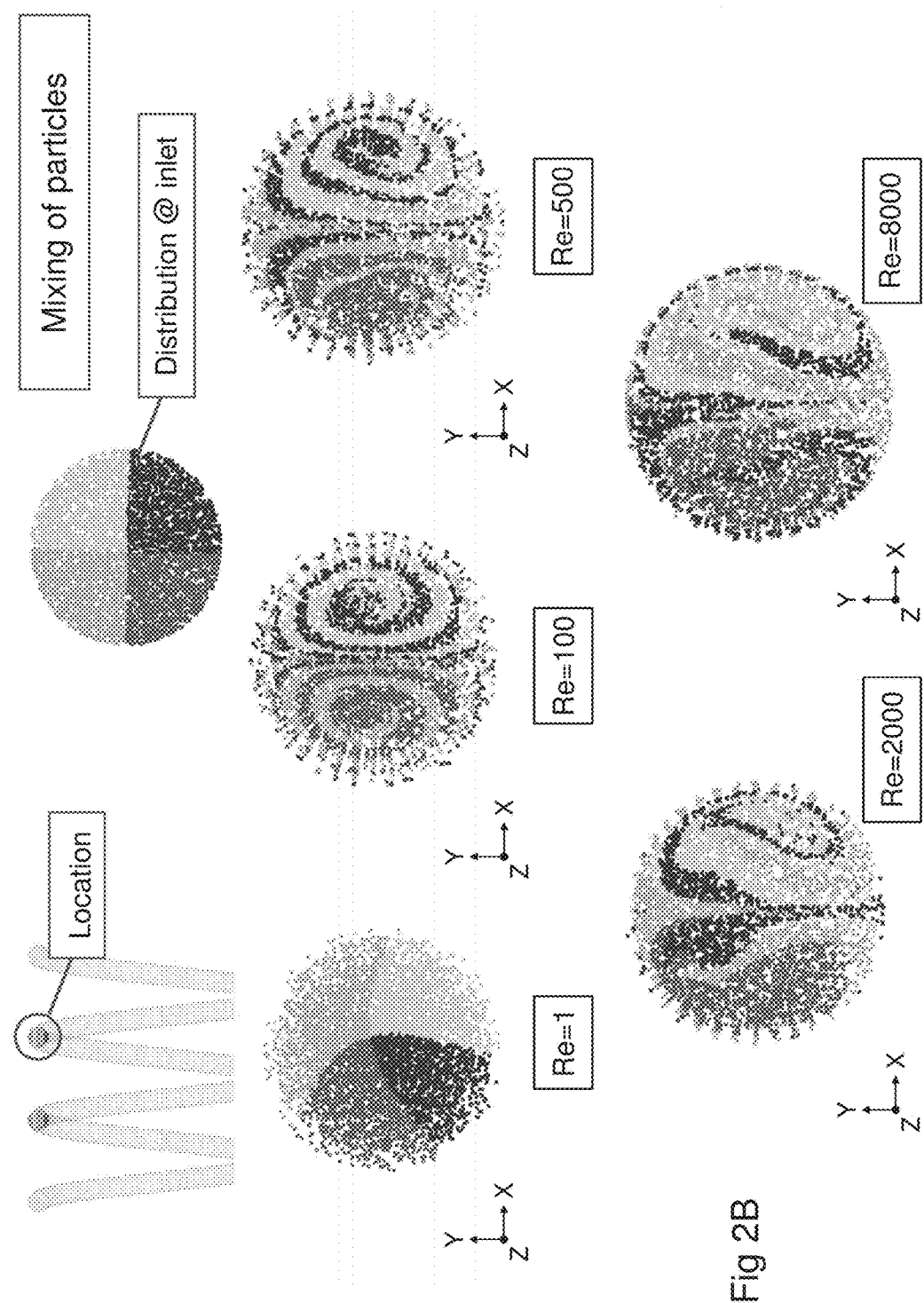

FIG. 2 shows the result of a numerical simulation of liquid flow according to the invention. The inner diameter of the helical tube was 6 mm; ($D_i/D$) was 12. The net flow rate was 0. The flow was pulsated as follows: velocity changed sinusoidally with a frequency of 1 Hz and a pulse length of 1 coil (LA=1).

The results show good radial mixing of passive tracer particles after 2 flow reversals for Re=100 to Re=8000 (corresponding to Dean numbers from De=29 to 2300). The results for the z-component of the vorticity (FIG. 2A) show that vortices are present over a wide range of Reynolds numbers (non-zero vorticity indicates the presence of vortices) which are able to prevent sedimentation of particles. The result with passive tracers (FIG. 2B) show that only two flow reversals under these conditions result in excellent mixing of the particles.

FIG. 3—Scheme of the setup, discussed in description above.

The invention claimed is:

1. Method for carrying out a continuous physical or chemical process comprising the steps of:
   i) flowing a fluid through a channel comprising an inlet and an outlet for said fluid, wherein said channel is at least in part curved and comprises at least two curvatures,
   ii) allowing said process to occur at least in part in said fluid in the presence of Dean vortices in said fluid, while
   iii) reversing the direction of the flow of said fluid in said channel multiple times, wherein Dean vortices in the fluid in the channel are maintained while the flow is reversed, and
   repeating step iii) at least once in the continuous process, wherein during reversal,
      relaxation time as defined by Tv is greater than reversal time as defined by Tf, both measured in seconds, whereby ($fd^2/v$)>1,
      f=1/Tf where Tf is a period in seconds where the fluid has a volumetric flow rate of less than 25% of a mean volumetric flow rate of the fluid, and the mean volumetric flow rate is per time period between two reversals of the direction of the flow,
      d is the internal diameter of the channel measured in meters, and
      v is the kinematic viscosity of the fluid in meters$^2$/second.

2. Method according to claim 1, wherein the Dean vortices in the fluid are maintained by reversing the direction of the flow of said fluid in said channel such that that the Dean number De of the flow of the fluid is 10 or more for 90% or more of the time.

3. Method according to claim 1, wherein a step of reversing the direction of the flow comprises the consecutive steps of: reducing the flow rate, reversing the flow and increasing the flow rate of said fluid in said channel, such that the fraction of the time wherein the fluid has a volumetric flow rate of less than 25% of the mean volumetric flow rate of the fluid per time period between two reversals of the direction of the flow is less than 10%.

4. Method according to claim 3, wherein the time period between two reversals of the direction of the flow comprises a step wherein the flow rate is essentially constant, and the ratio of the duration of a step wherein the flow rate is essentially constant and the duration of a step of reversing the direction of the flow is 5:1 or more.

5. Method according to claim 1, wherein said process comprises a multiphase reaction.

6. Method according to claim 1, wherein said process comprises crystallization of a liquid compound or of a compound dissolved in said fluid.

7. Method according to claim 1, wherein said reversing the direction of the flow of said fluid in said channel comprises changing the direction of the flow along the channel pathway whereby said fluid is flown through the channel by a combination of a first constant flow and a second oscillatory flow.

8. Method according to claim 1, wherein the direction of the flow is reversed each 60 seconds or less.

9. Method according to claim 1, wherein the direction of the flow is reversed by applying high pressure at one end of the channel or low pressure at another end of the channel.

10. Method according to claim 1, wherein said fluid is flowed alternately in the backward and forward direction in the channel, wherein a period wherein said fluid is flowed in the axial direction of the channel from inlet to outlet for the fluid in the channel is a forward flow step and a period wherein said fluid is flowed in the axial direction of the channel from outlet to inlet for the fluid in the channel is a backward flow step, wherein the channel comprises a helical tubular channel with a plurality of turns, and wherein the fluid flows forward through 0.1-100 turns in a forward flow step.

11. Method according to claim 10, wherein the fluid flows forward through 1-25 turns in a forward flow step and wherein the ratio between displaced fluid volume in a forward flow step and the displaced fluid volume in a backward flow step is more than 1.

12. Method according to claim 1, wherein the distance obtained by dividing the displaced fluid volume of a forward flow step by the cross-sectional area of the channel, moved by the fluid in the channel in a forward flow step is 10 times or more the inner diameter of the channel, wherein the channel has a constant cross-sectional area and inner diameter.

13. Method according to claim 1, wherein the flow of the fluid has a Dean number De of less than 3000.

14. Method according to claim 1 carried out in an apparatus, comprising
   a channel for flowing a fluid through said channel, wherein said channel is at least in part curved and comprises at least two curvatures, and
   one or more pulsating units for reversing the flow of said fluid in said channel, wherein said channel comprises a helical tube with a plurality of turns, wherein said plurality of turns is 2-10,000 turns, wherein said helical tube is a circular helix tube,
   wherein said channel is axially curved over 50% or more by length of the channel, and
   wherein $D_i/D$ is 0.01 or more, wherein $D_i$ is the inner diameter of said channel and D is the diameter of curvature of said channel.

15. Method according to claim 1, wherein the fluid has a laminar flow field with laminar mixing.

16. Method according to claim 1, wherein the fluid is flowed with a shear rate of 1-100 s$^{-1}$.

17. Method according to claim 1, wherein the physical or chemical process comprises crystallization or recrystallization of a fat compound.

18. Method according to claim 5, wherein said multiphase reaction involves one or more selected from the group consisting of crystallization, heterogeneous catalysis, phase transfer catalysis, emulsion polymerization, hydrogenation, oxidation and hydroformylation.

19. Method according of claim 6, wherein the direction of the flow is reversed 10 or more times during passage of fluid through the channel or during the physical or chemical process.

20. Method according of claim 19, wherein the direction of the flow is reversed 50 or more times during passage of fluid through the channel or during the physical or chemical process.

21. Method according of claim 20 wherein the direction of the flow is reversed 100-10,000 times during passage of fluid through the channel or during the physical or chemical process.

22. Method according to claim 8, wherein the direction of the flow is reversed each 30 seconds or less.

23. Method according to claim 22, wherein the direction of the flow is reversed each 0.1-10 seconds.

\* \* \* \* \*